(12) United States Patent
Aoyama et al.

(10) Patent No.: US 6,365,659 B1
(45) Date of Patent: Apr. 2, 2002

(54) POLYESTER COMPOSITION AND FILM, AND PRODUCTION METHOD

(75) Inventors: Masatoshi Aoyama; Keisuke Honda; Kenichi Tsutsumi, all of Shizuoka; Masahiro Kimura, Shiga, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/589,587

(22) Filed: Jun. 8, 2000

(51) Int. Cl.[7] .............................. C08K 5/04; C08K 5/09; C08K 3/10; B32B 15/08
(52) U.S. Cl. ...................... 524/399; 524/413; 524/414; 524/434; 524/435; 428/458; 428/464
(58) Field of Search ................................. 524/399, 413, 524/414, 434, 435; 428/458, 464

(56) References Cited

U.S. PATENT DOCUMENTS 5,474,854 A * 12/1995 Kagami et al. ............. 428/482
5,684,116 A    11/1997 Martl et al.
5,789,528 A     8/1998 Martl et al.

FOREIGN PATENT DOCUMENTS

| JP | A-9-241361 | 9/1997 |
|----|------------|--------|
| WO | WO 98/56848 | 12/1998 |

* cited by examiner

*Primary Examiner*—Kriellion A. Sanders
(74) *Attorney, Agent, or Firm*—Schnader Harrison Segal & Lewis LLP

(57) ABSTRACT

Polyester composition comprising a polyester and

- 0.5 to 300 ppm, expressed as titanium atoms, of a compound oxide (A) containing titanium as an essential element and also containing a metal element selected from the group consisting of aluminum, zirconium, germanium, tin and silicon, and
- 0.001 to 40 wt % of particles having an average particle size of 0.01 to 10 $\mu$m, and
- a production method, and a fiber or film composed of the polyester composition.

19 Claims, No Drawings

POLYESTER COMPOSITION AND FILM, AND PRODUCTION METHOD

TECHNICAL FIELD

The present invention relates to a polyester composition, a production method thereof and a polyester film. In more detail, it relates to a polyester composition having excellent moldability and heat resistance, and to a production method. Furthermore, it relates to a polyester film for packaging that has excellent keeping qualities when used as a packaging material, even when kept in direct contact with the contents, and a film that is especially suitable for being laminated and formed to make containers.

BACKGROUND ART

Polyesters are used in a variety of fields as fibers, films and bottles. Among them, polyethylene terephthalate has excellent mechanical strength, chemical properties, dimensional stability, etc.

In general, polyethylene terephthalate is produced from terephthalic acid or any of its ester formable derivatives and ethylene glycol. In commercial processes for producing high molecular polyesters, antimony compounds are widely used as polycondensation catalysts for the process. However, polymers containing antimony compounds have the following several deleterious properties.

For example, it is known that when a polyester produced by using an antimony catalyst is melt-spun into fibers, the residue of the antimony catalyst is deposited around the melt-spin die holes. When the deposit builds up, the filaments become defective. The deposit must be removed from time to time. The reason why the deposition of the antimony catalyst residue occurs is considered to be that the antimony compound in the polymer is transformed at or near the die and is partially vaporized and dissipated, causing a component mainly composed of antimony to remain and deposit at the die.

Furthermore, the antimony catalyst residue in the polymer is likely to grow into relatively large particles, to form foreign matter, and causes filter pressure rise during molding, and filament breaking during spinning and film breaking during film formation.

Because of the above problems, it is desired that the antimony content is very small or that the polyester does not contain antimony at all.

There are polycondensation catalysts other than antimony compounds disclosed, for example, in publication WO 95/18839, etc. This proposes a specific oxide containing titanium and silicon as main elements. However, these compound oxides present a problem that if they are added to provide sufficient polymerization activity as a polycondensation catalyst, the resulting polymer develops insufficient heat resistance. This lowers the polymerization degree when the polymer is molded. Furthermore, considerable coloring in the molding process occurs. Though it is generally practiced to adjust the color tone of the product by adding titanium oxide particles, etc., for example, for use as fibers, etc., the color tone cannot be sufficiently adjusted by the addition of such particles alone.

When fibers or films are produced from a polyester composition, it is generally practiced to add particles to the polymer for decreasing the friction caused when the fibers contact each other, or when the film contacts itself, or when the fibers or films contact various guides and rolls, in order to improve the process throughput, or to adjust the color tone and gloss of the product. However, the use of a specific compound oxide as a polycondensation catalyst faces the problem that the polymerization time is greatly prolonged if particles are added during the polymerization process.

Meanwhile, in the case of a polyester film used as a packaging material in flexible packaging, a polyester film is laminated on a sealant layer of polyethylene or polypropylene, etc., and the sealant layer is placed directly in contact with the contents. The contact of polyester film with its contents has been little taken into account in the past.

However, as packaging materials have been diversified and advanced in recent years, the use of a polyester film in direct contact with its contents has increased. Furthermore, with the extension of shelf life, it is highly desired to improve the quality of the polyester film for that purpose.

Especially when the aforementioned contents are foods or beverages, it can happen that the quality of the contents is changed by contact with the polyester film. This can be a problem, since a change of taste of beverages and foods decreases the commercial value of the contents.

As a packaging material, the use of a polyester film on the inside surface of a container is increasing. In this case, for example, a metal and a polyester film are laminated with each other, using or without using an adhesive, and are formed into cans.

In the past, for preventing the corrosion of the inside surface or outside surface of a metallic can, it was widely practiced to coat the metallic surface with a solution or dispersion having any of various thermosetting resins such as an epoxy resin or phenol resin dissolved or dispersed in a solvent. However, coating with such a thermosetting resin has faced the problems that drying the coating material takes a long time, reducing productivity, and the use of an organic solvent in a large quantity is likely to pollute the environment.

For solving these problems, a film is laminated on the material of the metallic can such as steel sheet or aluminum sheet, or any of these sheets treated on the surface by any of various methods such as plating. When the film-laminated metallic sheet is drawn or ironed to produce a metallic can, the film is required to have the following properties.

(1) Excellent laminatability on the metallic sheet.
(2) Excellent adhesiveness to the metallic sheet.
(3) Excellent formability without causing defects such as pinholes after completion of forming.
(4) Resistance to peeling, cracking or forming pinholes as a result of impact given to the metallic can.
(5) The taste of the contents of the cans may not be impaired by the metallic component or low molecular component of the film (hereinafter called "taste property"). Furthermore, the taste property should persist for a long period of time (hereinafter called "long-term keeping quality").

Recently, it has also been required that the ingress of the catalyst metal component of the film and the impurity component contained in the catalyst metal component into the contents of the metallic cans is kept as small as possible.

Many proposals have been made, especially to solve the problem of taste properties. For example, Japanese Patent Laid-Open (Kokai) No. Hei9-241361 attempts to satisfy both taste quality and productivity by limiting the catalyst metal and phosphorus contents to specific ranges. Also, for decreasing the low molecular component of the polyester, many proposals have been made. However, since the electrostatic casting of a molten polymer film requires certain quantities of a metal and phosphorus, these proposals cannot be said to be satisfactory in securing the taste property (especially long-term keeping life) and decreasing the catalyst metal component. Furthermore, also to limit the ingress of the catalyst metal component and the impurity component as much as possible, further improvement is demanded.

In the invention described in Japanese Patent Laid-Open (Kokai) No. Hei 9- 241361, the lamination with paper, nonwoven fabric or another polymer is not taken into account, and sufficient adhesiveness to any substrate and dimensional stability for lamination or printing, etc. are also not taken into account .

DISCLOSURE OF THE INVENTION

An object of the present invention is to overcome the disadvantages possessed by polyesters containing an antimony compound. Another object of the present invention is to provide a polyester film which overcomes the disadvantages of the films of the prior art, and which has especially excellent taste quality and long-term keeping qualities as a packaging material, can be laminated and formed, and has especially excellent taste properties and corrosion resistance, even after undergoing severe forming work such as drawing or ironing. A further object of the present invention is to provide a polyester film having excellent laminatability, adhesiveness, formability, processability and contents protectability, even if the lamination substrate is other than a metal, such as paper, nonwoven fabric or polymer.

The present invention relates to a polyester composition, comprising 0.5 to 300 ppm, expressed as titanium atoms, of a compound oxide containing titanium as an essential element, and also containing a metal selected from the group consisting of aluminum, zirconium, germanium, tin and silicon, and 0.001 to 40 wt % of preferable particles having an average particle size of 0.01 to 10 μm and further described hereinafter.

The present invention also relates to a method for producing the polyester composition, in which the product obtained by esterification reaction or ester interchange reaction, between an aromatic dicarboxylic acid or any of its ester formable derivatives and a diol or any of its ester formable derivatives, is polycondensed to produce the corresponding polyester composition, comprising the addition of the compound oxide A and the aforementioned inert particles, wherein the compound oxide A is added into the esterification or ester interchange reaction after the said inert particles have been added into said esterification or ester interchange reaction.

The present invention also relates to a film comprising the aforesaid polyester composition as a main component.

THE BEST EMBODIMENTS OF THE INVENTION

The polyester of the present invention is a polymer synthesized by polycondensation from an aromatic dicarboxylic acid or any of its ester formable derivatives and a diol or any of its ester formable derivatives, and is not especially limited, so long as it can be used as shaped objects such as fibers, films and bottles, for example.

The polyesters which can be used include, for example, polyethylene terephthalate, polytetramethylene terephthalate, polycyclohexylenedimethylene terephthalate, polyethylene-2,6naphthalene dicarboxylate, polyethylene-1, 2-bis(2-chlorophenoxy)ethane-4,4'-dicarboxylate, polypropylene terephthalate, etc. Among them, the present invention is suitable for the most generally used polyethylene terephthalate and polyester copolymers mainly composed of polyethylene terephthalate.

These polyesters can also be copolymerized with comonomers, for example, dicarboxylic acids such as adipic acid, isophthalic acid, sebacic acid, phthalic acid, 4,4'-diphenyldicarboxylic acid and dimer acid, their ester formable derivatives, dihydroxy compounds such as polyethylene glycol, diethylene glycol, hexamethylene glycol, neopentyl glycol, propylene glycol and polypropylene glycol, hydroxycarboxylic acids such as p-(β-hydroxyethoxy)benzoic acid, and their ester formable derivatives, etc.

In the case of polyesters for films, terephthalic acid and naphthalenedicarboxylic acid can be preferably used as dicarboxylic acids because of their heat resistance and taste properties. It is more preferable that 80 mol % or more of the acids used to form the polyester comprises terephthalic acid and/or naphthalenedicarboxylic acid. For applications especially requiring the aforementioned taste properties, it is preferable that 95 mol % or more of the acid used to form the polyester is terephthalic acid and/or naphthalenedicarboxylic acid, since the polyester has excellent long-term keeping qualities. Preferably used glycols include ethylene glycol, propanediol, butanediol, cyclohexanedimethanol, etc. For applications requiring especially good taste properties and long-term keeping qualities, it is more preferable that 95 mol % or more of the glycol component used to form the polyester is ethylene glycol.

The polyester composition of the present invention contains a compound oxide containing titanium as an essential element, and also containing a metal element selected from the group consisting of aluminum, zirconium, germanium, tin and silicon. The compound oxide is a residue of the compound added as a polymerization catalyst. In this case, the term "compound oxide" refers to a compound which has two or more main elements forming an oxide with oxygen. The compound oxide of the present invention contains titanium and a metal element selected from a group consisting of aluminum, zirconium, germanium, tin and silicon, and including oxygen to form one compound.

The compound oxide of the present invention, hereinafter sometimes referred to for brevity as compound oxide (A), must be present in the polyester composition in an amount of 0.5 to 300 ppm expressed as titanium atoms, enhancing the heat resistance of the polyester composition, preferably 2 to 200 ppm. A more preferable content is 3 to 100 ppm, and an especially preferable content is 3 to 50 ppm.

The method for synthesizing the aforementioned compound oxide is not especially limited. For example it can be synthesized by coprecipitation or partial hydrolysis or a coordination chemical sol-gel method, etc., using alkoxide compounds comprising the respective metal elements. In the coprecipitation method, a solution of a predetermined composition containing two or more components is hydrolyzed to obtain the intended compound oxide. In the partial hydrolysis method, one component is hydrolyzed beforehand, and the other component is added and subjected to further hydrolysis. In the coordination chemical sol-gel method, an organic multidentate ligand with plural functional groups in the molecule is caused to coexist with raw materials such as metal alkoxides, for forming a complex, thereby controlling the subsequent hydrolytic reaction rate, to obtain the intended compound oxide. These methods for synthesizing a compound oxide are described, for example, in Ueno et al., "Preparation of Catalysts Using Metal Alkoxides", IPC (1993), etc.

The titanium compound used for producing said compound oxide can be, for example, titanium isopropylate, titanium ethylate or titanium-tert-butyrate, etc. Similarly the compound of the metal element selected from a group consisting of aluminum, zirconium, germanium, tin and silicon can be, for example, aluminum isopropylate, aluminum-tert-butyrate, aluminum-sec-butyrate, methyl orthosilicate, ethyl orthosilicate, germanium methoxide, germanium ethoxide, tin butoxide, tin ethoxide or tin isopropoxide, etc.

Furthermore, the organic multidentate ligand used for the coordination chemical sol-gel method can be, for example, ethylene glycol, 1,2-propanediol, 1,2-butanediol, 1,3-propanediol, 1,3-butanediol or 2,4-pentanediol, etc. Furthermore, the solvent used for the reaction can be, for example, methanol, ethanol, propanol or isopropanol, etc.

It is preferable that the compound oxide of the present invention is ground before being added to the reaction system, to minimize polymerization retardation or variation and to reduce production of foreign matter, etc. The grinding method is not especially limited; dry grinding using a jet mill, etc., or wet grinding with high speed stirring in water or ethylene glycol, or medium type wet grinding using any of various beads, can be used. It is more preferable to classify by decantation or filtration, etc. after a grinding treatment.

If the polyester composition is used as a film, it is preferable that the polyester composition has the following properties.

First of all, as for the metal components of the compound oxide (A) of the present invention, a compound oxide containing titanium as an essential element and a metal element selected from a group consisting of aluminum, zirconium, germanium, tin and silicon is used. It is preferable that the polyester composition of the present invention satisfies the following formula (a), since the film obtained has excellent heat resistance and keeping qualities when it is expressed to direct contact with the contents.

$$1 \leq MA \leq 40 \qquad (a)$$

(where MA represents the total concentration (millimole %) of the Ti, Al, Zr, Ge, Sn and Si elements contained in the polyester composition of the present invention.)

It is especially preferable that MA is 1 to less than 20, in view of taste properties and long-term keeping qualities of the contents.

For use as a film, it is preferable that the compound oxide is a Ti/Si compound oxide, or a Ti/Si/Al compound oxide, or a Ti/Zr compound oxide, or a Ti/Zr/Al compound oxide, etc. Among them, a Ti/Si compound oxide can be used especially preferably. It is preferable that the Ti/Si molar ratio is 20/1~1/20. A more preferable molar ratio range of Ti/Si is 10/1~1/1.

The polyester composition of the present invention must contain the dispersable particles having an average particle size of 0.01 to 10 μm in an amount of 0.001to 40 wt % based on the weight of the polyester composition. This decreases the friction encountered with various guides, rollers, etc. which it contacts during the molding process. This improves the process throughput and adjustment of the color tone of the product. It is more preferable that the average particle size of the particles is 0.05 to 5 μm, and a further more preferable range is 0.1 to 5 μm. On the other hand, it is more preferable that the particle content is 0.01 to 20 wt %, and a further more preferable range is 0.03 to 10 wt %, to achieve especially good process throughput and color tone.

For use as a packaging film, it is preferable for the polyester to contain 0.01 to 1 wt % of dispersible particles having an average particle size of 3 μm or less, to achieve good slipperiness and adhesiveness at the time of lamination. An especially preferable particle content range is 0.03 to 0.5 wt %.

The dispersible particles can be, for example, inorganic particles of silicon dioxide, titanium dioxide, calcium carbonate, barium sulfate, aluminum oxide or zirconium oxide, etc., or organic high polymer particles of crosslinked polystyrene, etc. Among these particles, titanium dioxide particles or silicon dioxide particles are preferable since they have good dispersibility in the polymer and relatively low cost.

These particles are produced by any of various wet and dry methods, and as required, pretreated by grinding, classifying, etc., before being added to the polyester reaction system.

It is preferable that the polyester composition of the present invention contains at least one compound (C) selected from the group consisting of alkaline earth metal compounds and cobalt compounds, together with the compound oxide (A). The preferable content of at least one compound (C) selected from the group consisting of alkaline earth metal compounds and cobalt compounds is 5 to 300 ppm as the metal atoms of the corresponding element based on the quantity of the polyester composition. A more preferable range is 5 to 150 ppm, and a further more preferable range is 10 to 100 ppm, since the polyester composition acquires better color tone and heat resistance. Among these, a cobalt compound is preferable since the color tone of the polyester composition becomes especially good. It is preferable that the cobalt compound content is 5 to 250 ppm as metal atoms, based on the quantity of the polyester composition. A more preferable range is 5 to 120 ppm, and a further more preferable range is 10 to 80 ppm, since the color tone of the polyester composition becomes especially good. Furthermore, it is preferable that the molar ratio of titanium atoms in the compound oxide (A) to the cobalt atoms (Ti/Co) is 0.3 to 20, since the heat resistance of the polyester composition becomes especially good.

The alkaline earth metal or cobalt contained in the polyester composition of the present invention is mainly the residue of the compound added in the production process of the polyester composition. The compound is not especially limited, but those which can be used as the alkaline earth metal compound include, for example, chlorides, acetates, carbonates, etc. of respective alkaline earth metals, and those which can be used as the cobalt compound include, for example, cobalt chloride, cobalt nitrate, cobalt carbonate, cobalt acetylacetonate, cobalt naphthenate, cobalt acetate tetrahydrate, etc.

For use as a film, an alkali metal compound can be included in the polyester composition so long as the taste property is not impaired. It is preferable that the alkali metal compound is present in an amount of 20 ppm or less as the total quantity of alkali elements. More preferable is 10 ppm or less, and especially preferable is 8 ppm or less. If a polyester having a melting point of 246 to 280° C. is used, 1 to 20 ppm of an alkali metal element may be present since the resulting heat resistance is excellent.

It is preferable that the polyester composition of the present invention contains a specific quantity of a phosphorus compound (B) together with the compound oxide (A). It is preferable that the phosphorus compound (B) is present in an amount of 0.5 to 400 ppm, expressed as phosphorus atoms, based on the quantity of the polyester composition. A more preferable range is 2 to 200 ppm, and a furthermore preferable range is 3 to 100 ppm, since the heat resistance of the polyester composition becomes better. Furthermore, it is preferable that the molar ratio (Ti/P) of titanium atoms in the compound oxide (A) and phosphorus atoms in the phosphorus compound (B) is 0.1 to 20, since the heat resistance of the polyester composition becomes good. A more preferable Ti/P ratio range is 0.2 to 10, and a further more preferable range is 0.3 to 5.

The phosphorus element contained in the polyester composition of the present invention is mainly the residue of the phosphorus compound (B) added in the production process of the polyester composition. The phosphorus compound (B) can be, for example, phosphoric acid, phosphorous acid, phosphonic acid or any of their lower alkyl esters and phenyl esters, specifically, phosphoric acid trimethyl phosphate, triethyl phosphate, triphenyl phosphate, phosphorous acid, trimethyl phosphite, methylphosphonic acid, phenylphosphonic acid, benzylphosphonic acid, methyl methylphosphonate, ethyl phenylphosphonate, phenyl benzylphosphonate or ethylphosphonoacetate, etc. For use in a film, phosphoric acid or phosphorous acid, etc. can be preferably used as the phosphorus compound.

In the polyester composition of the present invention, it is more preferable that the metal elements and phosphorus element satisfy the following formula (b), to achieve good taste properties and long-term keeping qualities.

$$-20 \leq MA-PA \leq 20 \quad (b),$$

where PA represents the concentration (millimole %) of the phosphorus element present in the polyester composition of the present invention.

It is more preferable that the value of MA-PA is -10 to 10, since the taste properties and long-term keeping qualities are further improved.

It is preferable that in the polyester composition of the present invention, the total concentration MA (millimole %) of the Ti, Al, Zr, Ge, Sn and Si elements in the composition and the concentration PA (millimole %) of the phosphorus element satisfy the following formula (1).

$$0.1 \leq MA/PA \leq 20 \quad (1)$$

For process throughput and moldability, it is more preferable to satisfy the equation $0.5 \leq MA/PA \leq 10$, and it is further more preferable to satisfy the equation $0.9 \leq MA/PA \leq 5$.

In the polyester composition of the present invention, it is preferable that the quantity of carboxyl end groups is 10 to 70 equivalents/ton for good process throughput and hydrolysis resistance. A more preferable range is 15 to 65 equivalents/ton, and a further more preferable range is 20 to 60 equivalents/ton.

For use as a polyester film for packaging, for good long-term keeping qualities after heat treatment in the printing of containers and flexible packages, in the production process of bag making, etc., and in the contents filling process, and also for better adhesiveness to the substrate, it is preferable that the quantity of carboxyl end groups in the polyester is 25 to 50 equivalents/ton, and a more preferable range is 30 to 45 equivalents/ton.

It is preferable that the diethylene glycol content of the polyester is 0.01 to 5 mol %, and a more preferable range is 0.01 to 3 mol %, since even if the packaging material is subject to considerable heat history such as retorting and heat treatment, excellent protection of contents and excellent taste properties can be assured.

For further improved taste properties, it is preferable that the acetaldehyde content of the film is 15 ppm or less, more preferably 10 ppm or less. If the acetaldehyde content is more than 15 ppm, the taste properties may become poor. The method for limiting the acetaldehyde content of the film to 15 ppm or less is not especially limited. For example, when the polyester is produced, the polyester can be heat-treated under reduced pressure or in an inactive gas atmosphere at a temperature lower than the melting point of the polyester, for removing the acetaldehyde produced by thermal decomposition in the polycondensation reaction, etc., or preferably, the solid phase polymerization of the polyester can be effected under reduced pressure or in an inactive gas atmosphere at 155° C. to lower than the melting point, or a vent extruder can be used for melt extrusion, or the polyester can be melt-extruded at an extrusion temperature comprising the melting point +25° C. or lower, preferably the melting point +20° C. or lower in a short time, or when the polyester is biaxially stretched in film production, it can be heat-treated.

It is preferable that the melting point of the polyester to be used as a film is 200 to 280° C. for good heat resistance, formability, taste properties and long-term keeping qualities. For an application in which formability and adhesiveness are highly important, it is preferable that the melting point is 200 to 245° C. Furthermore, especially in view of heat resistance, taste properties and long-term keeping qualities, it is preferable that the melting point is 246 to 280° C.

Furthermore, it is preferable that the inherent viscosity [η] of the film is 0.5 to 1.3. Especially for applications requiring heat resistance and temporal durability, it is preferable that the inherent viscosity [η] is 0.6 to 1.1.

It is preferable that the polyester film for packaging has a face orientation factor of 0.08 to 0.17 for formability and film strength. Especially for use as a laminate with a substrate such as paper or metallic sheet, it is preferable that the face orientation factor is 0.08 to 0.15. A more preferable range is 0.08 to 0.14. The face orientation factor is expressed by $f_n=(n_{MD}+n_{TD})/2-n_{ZD}$, where $n_{MD}$ is the refractive index of the film in the machine direction; $n_{TD}$ is the refractive index of the film in the transverse direction; and $n_{ZD}$ is the refractive index of the film in the normal direction.

For the sake of formability, heat resistance and temporal durability, it is preferable that the refractive index in the normal direction, $n_{ZD}$, is 1.5 or more. It is especially preferable that $n_{ZD}$ is 1.51 to 1.55, wherein both formability and temporal durability can be satisfied.

Especially for an application where film formability is important, it is preferable that a polyester film (polyester B) satisfying the following formula (c) is laminated at least on one side of the film (polyester A) mainly composed of the polyester composition, since formability becomes especially good.

$$MB \geq MA \quad (c)$$

(where MB is the concentration (millimole %) of all the catalyst metal elements contained in the laminated polyester B.)

It is preferable that MB-MA is 5 millimole % to 200 millimole %, and a more preferable range is 10 millimole % to 100 millimole %.

It is preferable that the thickness of the film of the present invention is 1 to 1000 μm for good formability after lamination on a metal, heat to resistance, coverability, and also for good heat resistance, firmness and strength for use as laminated flexible packages or containers. A more preferable range is 5 to 200 μm. Especially for extensive use as flexible packages or containers, a range from 8 to 100 μm is preferable.

When a laminated film is formed by laminating the polyester film of the present invention on another polyester film, the thickness of the laminated film is not especially limited. However, it is preferable that the thickness of the other polyester film accounts for 1 to 90% of the total thickness of the laminated film. If the taste properties and long-term keeping qualities are important, it is more preferable that the thickness of the other polyester film accounts for 1 to 50% of the total thickness. It is further more preferable that the thickness of the other polyester film accounts f or 5 to 40% of the total thickness, and the most preferable range is 5 to 20%.

The method for producing the polyester composition of the present invention is described below in reference to polyethylene terephthalate.

The high molecular polyethylene terephthalate used as fibers or film, etc. is usually produced according to either of the following processes; (1) the steps of obtaining low molecular polyethylene terephthalate or oligomer by the direct esterification reaction of terephthalic acid and ethylene glycol, and obtaining high molecular polyethylene terephthalate by subsequent polycondensation reaction, or (2) a process comprising the steps of obtaining a low molecular polymer by ester interchange reaction of dimethyl terephthalate (DMT) and ethylene glycol followed by obtaining high molecular polyethylene terephthalate by subsequent polycondensation reaction. The esterification reaction takes place even without any catalyst, but the ester interchange reaction is caused usually by using a compound of manganese, calcium, magnesium, zinc or lithium, etc. as a catalyst. Furthermore, after substantial completion of an ester interchange reaction, it is practiced to add a phosphorus compound for inactivating the catalyst used for the reaction.

In the case of the polyester composition of the present invention, both the compound oxide (A) comprising titanium as an essential element and also containing a metal element selected from the group consisting of aluminum, zirconium, germanium, tin and silicon, and particles can be added at optional timing from before initiating the series of reactions of (1) or (2) to before substantially initiating the polycondensation reaction.

In the present invention, it is preferable that the compound oxide (A) is added after the esterification reaction or ester interchange reaction has been substantially completed and after the separate dispersible particles have been added. If both the compound oxide (A) and the inert particles are added simultaneously to the reaction system, or if the compound oxide (A) is added before the dispersible particles are added, it can happen that the polymerization time is prolonged or varied, lowering productivity or stability. It is preferable that the period of time after completing the addition of the inert particles before initiating the addition of the compound oxide (A) is 1 minute to 60 minutes. It is more preferable that period of time is 3 to 30 minutes.

The addition of time when at least one compound (C) selected from the group consisting of alkaline earth metal compounds and cobalt compounds are added in the present invention is not especially limited, but it is preferable that the compound (C) is added together with the separate dispersible particles after the esterification reaction or ester interchange reaction has been substantially completed, or is added after adding the particles and before adding the compound oxide (A), since the polymerization time is less prolonged or varied.

It is preferable that the phosphorus compound is added in the stage of a low molecular polymer after the esterification reaction or ester interchange reaction has been substantially completed, or at any optional time thereafter.

When the respective compounds are added, they can be added to the reaction system directly as powders or liquids, but it is preferable to disperse or dissolve them into ethylene glycol, etc. before addition, since they are likely to be homogeneously dispersed in the reaction system.

The above reaction can be effected by a batch operation or a semi-batch operation or a continuous operation, etc.

The polyester film of the present invention is a film comprising the polyester composition of the present invention as a main component. It means that the content of the polyester composition in the film is at least 50 wt %. It is more preferable that the content is at least 60 wt %.

The method for producing the film of the present invention is not especially limited. However, for example, a polyester is dried as required, supplied into a melt extruder and extruded from a slit die as a sheet, and the sheet is brought into contact with a casting drum, to be cooled and solidified, for obtaining a cast sheet. The sheet can be brought into contact with the casting drum, by electrostatic application, or by forming a water film between the sheet and the casting drum, or raising the temperature of the casting drum to allow sticking. For the purpose of heat resistance and temporal durability, it is especially preferable that the cast sheet is stretched in the machine direction and in the transverse direction of the film and heat-treated, for obtaining a film having an intended refractive index in the normal direction. For film quality, it is preferable to stretch using a tenter, and either sequential biaxial stretching of stretching in the machine direction and subsequently stretching in the transverse direction or simultaneous biaxial stretching of stretching in the machine direction and the transverse direction almost simultaneously, is desirable. Especially, simultaneous biaxial stretching using a linear motor is especially preferable since formability becomes good. The stretching ratios in the respective directions are 1.5 to 10.0 times, and a preferable range is 2.0 to 6.0 times. The stretching ratio in either the machine direction or the transverse direction can be larger or both the stretching ratios can also be equal. It is preferable that the stretching rate is 1,000%/min to 200,000%/min, and it is preferable that the stretching temperature is the glass transition temperature of the polyester to the glass transition temperature +80° C. A more preferable range is glass transition temperature +20~60° C. It is especially preferable that the longitudinal stretching temperature of sequential biaxial stretching is 100 to 130° C.

It is preferable that the preheating temperature before longitudinal stretching is 95° C. to 150° C. An especially preferable range is 100° C. to 140° C., since formability, film uniformity and film forming speed can be improved. It is preferable that the preheating time is 0.5 to 60 seconds. A more preferable range is 1 to 30 seconds, and an especially preferable range is 2 to 15 seconds, since formability, film uniformity and film forming speed can be improved. As for the stretching method, to obtain a low oriented film at a low stretching rate, multi-step stretching of 2 or more steps can also be adopted. It is preferable that the stretching rate at each step is 1,000 to 20,000%.

Furthermore, the stretched film is heat-treated. The heat treatment can be any conventional known method of heat treatment in an oven or heat treatment on heated rolls, etc. It is preferable that the heat treatment temperature is any temperature of 60 to 250° C. A more preferable range is 150 to 240° C. It is preferable that the heat treatment time is 0.1 to 60 seconds. A more preferable range is 1 to 20 seconds. The heat treatment can be applied while the film is relaxed in the machine direction and/or the transverse direction.

After completion of heat treatment, the film can also be restretched in each direction once or more, and thereafter, can also be again heat-treated.

It is preferable that the film is treated on1 the surface by corona discharge, etc., to further improve adhesiveness, since the film properties can be improved.

The film of the present invention can be coated with any of various compounds. The coating compound, method and thickness are not especially limited so long as the effects of the present invention are not impaired.

The polyester film of the present invention can be preferably used as a packaging material. The application for packaging is not especially limited. The polyester film can be used for vapor deposition of aluminum, vapor deposition of a metal oxide, as a polyester sealant, as flexible packages or containers by lamination with another polyester film, etc. Above all, the film is suitable for use as formed by folding and bending, drawing, ironing, etc. and furthermore, for use as formed after lamination with a substrate. The film is especially suitable for use in severe forming work as drawing or ironing. It is preferable that the lamination substrate is selected from paper, nonwoven fabrics and metals. An adhesive, etc. can be used between the polyester film and the paper, nonwoven fabric or metal so long as the properties are not impaired greatly, but it is preferable to directly bond them by heat without using any adhesive.

A packaging material consisting of paper and a polyester film, or a nonwoven fabric and a polyester film, or a metal and a polyester film can be preferably used, for example, as containers, since the polyester film causing reduced taste properties and long-term keeping qualities can be thinned. In this case, it is especially preferable that the lamination substrate is a metal, for such reasons that its barrier properties are good and that the packaging material can be sufficiently heated, to further improve the protectability of contents. In these applications, it is especially preferable to use as-formed containers containing a beverage or food. On the other hand, it is preferable that paper or a nonwoven fabric is used as the lamination substrate, for such reasons that the packaging material can be lighter in weight and higher in heat resistance and that multi-color printing is easy.

The metallic sheet used in the present invention is not especially limited, but for good formability, a metallic sheet mainly made of iron or aluminum is preferable. In the case of a metallic sheet made of iron, an inorganic oxide layer such as a chemical conversion layer can be formed on the surface to improve adhesiveness and corrosion resistance, for example, by chromic acid treatment, phosphoric acid treatment, chromic acid/phosphoric acid treatment, electrolytic chromic acid treatment, chromate treatment, or chromium chromate treatment, etc. Especially, it is preferable that a chromium oxide hydrate layer is formed in an amount of 5 to 200 mg/m$^2$ expressed as metal chromium. Furthermore, a ductile metal layer of nickel, tin, zinc, aluminum, gun metal or brass can be formed by plating. In the case of tin plating, a plating quantity of 1 to 20 mg/m$^2$ is preferable, and in the case of nickel or aluminum, a plating quantity of 1 to 25 g/m$^2$ is preferable.

The paper used in the present invention is not limited, but paper with a pulp content of 90% or more is preferable, and recycled paper may also be used.

It is preferable to form a container in which the film thickness satisfies the following formula (d) after forming.

$$0.1 \leq TF/TI \leq 0.9 \qquad (d)$$

(where Th is the film thickness ($\mu$m) of the portion with the smallest film thickness of the formed container, and TI is the film thickness ($\mu$m) of the portion with the largest film thickness of the formed container.)

Furthermore, a range of $0.1 \leq T/TI \leq 0.6$ is preferable for manifesting the performance of the polyester film of the present invention to the maximum extent.

The methods for measuring and evaluating properties in the present invention are described below.

(1) Inherent viscosity [$\eta$] of polyester

The polyester was dissolved with orthochlorophenol as a solvent, and the viscosity of the solution was measured using a viscometer at 25° C.

(2) Metal contents of titanium, phosphorus, alkaline earth metals, akali metals, cobalt, etc. of polyester Obtained by fluorescent X-ray, ICP (inductively coupled plasma) emission spectrometry or atomic absorption analysis.

When the polyester concerned contained titanium dioxide particles or silicon oxide particles, the following pretreatment was effected for eliminating the influence of the particles before fluorescent X-ray or ICP emission spectrometry, for confirming the content of the compound oxide containing titanium as an essential element and a metal element selected from aluminum, zirconium, germanium, tin and silicon, as the polymerization catalyst residue of the present invention. That is, the polyester was dissolved in orthochlorophenol, and the viscosity of the polymer solution was adjusted by chloroform as required. The solution was centrifuged to cause the particles to settle. Then, the supernatant solution only was recovered by decantation, and acetone was added, to reprecipitate the polymer. The precipitate was secured by filtration and washed to obtain the polymer free from the particles. The metal contents of the polymer pretreated like this were analyzed.

(3) Color Tone of Polyester

A color difference meter (SM Color Computer Model SM-3) produced by Suga Shikenki K. K. was used to measure the Hunter values (values L, a and b) of pellets of the polyester.

As the color tone of the polymer, it is preferable that especially the value b is 5 or less. More preferable is 4 or less, and especially preferable is 2 or less.

(4) Quantity of carboxyl end groups of polyester

The polyester was dissolved in o-cresol/chloroform (ratio by weight 7/3) at 100° C., taking 20 minutes, and an alkali was used for potentiometric titration. In the case of a laminated film, each layer was separated by scraping, etc. for obtaining the quantity of carboxyl end groups.

(5) Melting point of polyester

The polyester was melted, quickly cooled and heated at a heating rate of 10° C./min for measurement using a differential scanning calorimeter (Model DSC2 produced by Perkin Elmer). The melting point was obtained from the melting peak.

(6) Heat resistance of polyester

Pellets of the polyester were dried at 150° C. at a reduced pressure of 133 Pa or less for 10 hours, and a proper quantity of it was supplied into a test tube. The test tube was internally purged by nitrogen, and immersed and held in a silicone oil bath preheated to 300° C. When all the contents were molten, and also after lapse of 8 hours since then, the polymer was sampled. When the inherent viscosities of the respective samples were [$\eta$]$_0$ and [$\eta$]$_1$, the value expressed by the following formula (2) was used as the heat resistance index.

$$\text{(Heat resistance index)} = \{[\eta]_0 - [\eta]_1\}/[\eta]_0 \qquad (2)$$

A polymer having a heat resistance index of less than 0.65 has preferably small decline of polymerization degree at the time of molding.

(7) Face orientation factor of film

The refractive index of the film in the machine direction, $n_{MD}$, the refractive index of the film in the transverse direction, $n_{TD}$, and the refractive index of the film in the normal direction, $n_{ZD}$, were obtained using an Abbe refractometer with a sodium d-line (wavelength 589 mn) as the light source, to obtain the face orientation factor, $f_n=(n_{MD}+n_{TD})/2-n_{ZD}$.

In the case of a B/A/B laminated film, the layers B were scraped off, to obtain the value of layer A (8) Film formability −1 (drawing and ironing)

A heated TFS (tin-free steel) sheet (0.2 mm thick) was thermally laminated with the polyester film on both sides at 100 m/min, and the laminated sheet was cooled by 60° C. water and formed by a drawing and ironing machine. The temperature of the TFS was set to ensure that the face orientation factor of the film after thermal lamination might be 0.03 to 0.04. A film with a face orientation factor of 0 before lamination was thermally laminated at a temperature of melting point +5° C. The laminated metallic sheet was drawn and ironed at a reduction of 45% (reduction={(Y1−Y2)/Y1)}×100, where Y1 is the thickness of the laminated metallic sheet (mm) before drawing and ironing and Y2 is the thickness of the thinnest portion of the laminated metallic sheet after drawing and ironing (mm)), to obtain cans. The cans were filled with ion exchange water, and one week later, the film appearance was evaluated according to the following criterion:

⊚: The film was neither whitened nor cracked.

○: The film was somewhat whitened, but not cracked.

Δ: The film was whitened, but not cracked.

x: The film was whitened and cracked.

(9) Film formability −2 (folding)

Paper was thermally laminated with the polyester film on both sides (face orientation factor 0.02~0.03) and the laminated paper was folded to make containers. A film with a face orientation factor of 0 before lamination was thermally laminated at a temperature of melting point +5° C., and the laminated paper was folded, to, prepare beverage packs. The beverage packs were filled with ion exchange water, and one week later, the paper portions of the packs were removed, to evaluate the films at the folded portions according to the following criterion:

⊚: The film was neither whitened nor cracked.

○: The film was somewhat whitened, but not cracked.

Δ: The film was whitened, but not cracked.

x: The film was whitened and cracked.

(10) Taste property

Metallic containers laminated on the inside surface with the polyester film were filled with ion exchange water, sealed by seaming, heat-treated at 125° C. for 20 minutes, and stored at 40° C. for 1 week. They were opened, and the stored ion exchange water was compared with the ion exchange water for control by 50 panelists. The taste property was evaluated according to the following criterion:

⊚: Three or less persons felt that the taste and transparency changed.

○: Four to six persons felt that the taste and transparency changed.

Δ: Seven to nine persons felt that the taste and transparency changed.

x: Ten or more persons felt that the taste and transparency changed.

(11) Long-term keeping quality

Metallic containers laminated on the inside surface with the polyester film were filled with ion exchange water, sealed by seaming, heat-treated at 125° C. for 20 minutes, and stored at 40° C. for 2 months. They were opened, and the stored ion exchange water was compared with the ion exchange water for control by 50 panelists. The taste property was evaluated according to the following criterion:

⊚: Three or less persons felt that the taste and transparency changed.

○: Four to six persons felt that the taste and transparency changed.

Δ: Seven to nine persons felt that the taste and transparency changed.

x: Ten or more persons felt that the taste and transparency changed.

The present invention is described below concretely in reference to examples, but is not limited thereto or thereby.

EXAMPLE 1

Ten parts of 2-methylpentane-2,4-diol and 2 parts of ethanol were added to 10 parts of a mixture consisting of titanium isopropylate and ethyl orthosilicate with a composition of Ti/Si=90/10 (molar ratio), and the mixture was stirred at 60 to 70° C. for 3 hours. Three parts of ethanol containing 2 parts of water were slowly added to the mixture dropwise, and the mixture was heated to 90~100° C., to obtain a transparent gel. The gel was allowed to stand at the same temperature for 15 hours, and dried under reduced pressure at 130° C., using a rotary evaporator, to obtain a dry gel. Furthermore, 10 parts of the dry gel were added to 90 parts of ethylene glycol, to prepare an ethylene glycol slurry containing a titanium/silicon compound oxide with a composition of Ti/Si=90/10 (molar ratio).

On the other hand, low molecular polyethylene terephthalate produced from highly pure terephthalic acid and ethylene glycol according to a conventional method, not containing any catalyst was molten at 250° C. and stirred, and phosphoric acid was added to the molten material to ensure that the phosphorus atom content in the obtained polymer might be 30 ppm. Then, an ethylene glycol slurry of titanium dioxide particles with an average particle size of 0.56 μm was added to ensure that the particles content in the obtained polymer might be 0.5 wt %. Five minutes after completing the addition of the grain slurry, cobalt acetate tetrahydrate was added to ensure that the cobalt atom content in the obtained polymer might be 47 ppm, and furthermore, the ethylene glycol slurry of the Ti/Si compound oxide prepared before was added to ensure that the compound oxide content in the obtained polymer might be 15 ppm. Then, while said low molecular polymer was stirred at 30 rpm, the reaction system was gradually heated from 250° C. to 285° C., and the pressure was lowered to 40 Pa. Both the times taken to reach the final temperature and the final pressure were 60 minutes. When a predetermined stirring torque was reached, the reaction system was purged by nitrogen and returned to atmospheric pressure, to stop the polycondensation reaction, and the polymer was discharged into cold water as a strand and immediately cut, to obtain pellets of a polyester. The time taken after the reduced pressure took place till the predetermined stirring torque was reached was 3 hours and 10 minutes.

The obtained polymer was 0.67 in inherent viscosity, 24 equivalents/ton in the quantity of carboxyl end groups, L=74 and b=0.6 in color tone, and 0.54 in the heat resistance index. The quantities of metal elements as the polymerization catalyst residue from the compound oxide were determined by ICP emission spectrometry, and it was confirmed that the titanium atom content was 15 ppm and that the silicon atom content was 0.97 ppm. Thus, pellets of a polyester with good color tone and heat resistance were obtained.

The pellets were dried and supplied into an extruder type spinning machine for melt spinning at a spinning temperature of 290° C. In this case, as the filter, a metallic nonwoven fabric with an absolute filtration accuracy of 10 μm was used, and as the die, a round hole with a diameter of 0.3 mm was used. The yarn discharged from the die was gradually cooled in a 30 cm long 25 cm inner dia. 300° C. heating cylinder, cooled and solidified by applying chimney cooling air, oiled and taken up at a take-up speed of 1000 m/min, to obtain an unstretched yarn. The unstretched yarn was stretched at a stretching temperature of 95° C. while changing the stretching ratio adequately to ensure that the elongation of the stretched yarn might be 38 to 40%, and heat-treated at 120° C., to obtain a stretched yarn.

In the melt spinning process, the filtration pressure rise during spinning was little observed, and during stretching, the yarn was not broken, to show good moldability. The results are shown in Table 1.

EXAMPLES 2 TO 14 AND COMPARATIVE EXAMPLES 1 TO 5

Polymers were produced and melt-spun as described for Example 1, except that the kind and quantity of the metal compound and the grain content were changed as shown in Tables 1 and 2. The results are shown in Tables 1 and 2.

For the polyester composition of Comparative Example 2 only, a low molecular polymer obtained by the ester interchange relation, not by direct polymerization was polycondensed to obtain a polymer. As the catalyst of the ester interchange reaction, zinc acetate and manganese acetate were used.

The polyester compositions of the present invention were good in color tone, heat resistance and melt spinnability, but those not in conformity with the present invention were poor in color tone and heat resistance, or significant in filtration pressure rise in the melt spinning step, and frequent in yarn breaking. When the polymers of Comparative Examples 1 and 2 not containing resins were used, yarn breaking during spinning and filtration pressure rise did not occur, but since the friction with guides, rollers, etc. during stretching was large, fuzzing occurred frequently to show poor moldability.

As for spinnability and stretchability, the filtration pressure rise and yarn breaking are caused by various factors, and a foreign matter in a polymer is one of main causes. A case where filtration pressure rise did not occur or little occurred in the spinning step was evaluated as good. A case where yarn breaking did not occur or little occurred was evaluated as good.

TABLE 1

| | Particles | | Compound oxide (A) | | Phosphorus compound (B) | | Alkaline earth metal or cobalt compound (C) | |
|---|---|---|---|---|---|---|---|---|
| | Kind | Average particle size (μm) | Content (wt %) | Ti/Si (molar ratio) | Content as titanium atoms (ppm) | Content as phosphorus atoms (ppm) | Ti/P (molar ratio) | Metal (content as metal atoms) (ppm) | Ti/metal (molar ratio) |
| Example 1 | Titanium dioxide | 0.56 | 0.5 | 90/10 | 15 | 30 | 0.32 | Cobalt (47) | 0.39 |
| Example 2 | Titanium dioxide | 0.56 | 0.5 | 90/10 | 40 | 150 | 0.17 | Cobalt (47) | 1.0 |
| Example 3 | Titanium dioxide | 0.56 | 0.5 | 30/70 | 60 | 32 | 1.2 | Magnesium (5) | 6 |
| Example 4 | Titanium dioxide | 0.56 | 0.5 | 95/5 | 15 | 1.5 | 6.5 | Cobalt (47) | 0.39 |
| Example 5 | Titanium dioxide | 0.56 | 0.5 | 80/20 | 20 | 32 | 0.40 | Cobalt (120) | 0.20 |
| Example 6 | Titanium dioxide | 0.56 | 2.5 | 90/10 | 40 | 30 | 0.86 | Cobalt (47) | 1.0 |
| Example 7 | Titanium dioxide | 0.56 | 0.01 | 90/10 | 40 | 30 | 0.86 | Cobalt (47) | 1.0 |
| Example 8 | Silicon oxide | 0.32 | 1.0 | 90/10 | 40 | 30 | 0.86 | Cobalt (47) | 1.0 |
| Example 9 | Silicon oxide | 0.15 | 0.5 | 90/10 | 40 | 30 | 0.86 | Cobalt (47) | 1.0 |
| Example 10 | Silicon oxide | 2.0 | 0.5 | 90/10 | 40 | 30 | 0.86 | Cobalt (47) | 1.0 |

| | | Properties of polymer | | | | | Spinnability and stretchability (filtration pressure and yarn breaking) |
|---|---|---|---|---|---|---|---|
| | M/P | Inherent viscosity | Quality of carboxyl and groups (eq/tons) | Value L | Value b | Heat resistance index | |
| Example 1 | 1.18 | 0.67 | 24 | 74 | 0.6 | 0.54 | Good |
| Example 2 | 0.36 | 0.66 | 20 | 76 | 0.3 | 0.50 | Good |
| Example 3 | 4.25 | 0.67 | 27 | 75 | 2.5 | 0.57 | Good |
| Example 4 | 23.5 | 0.67 | 45 | 72 | 0.5 | 0.61 | Good |
| Example 5 | 2.49 | 0.66 | 38 | 70 | −1.4 | 0.59 | Good |
| Example 6 | 1.73 | 0.67 | 25 | 78 | 0.4 | 0.56 | Good |
| Example 7 | 1.73 | 0.66 | 24 | 66 | 0.7 | 0.55 | Good |
| Example 8 | 1.73 | 0.65 | 26 | 68 | 0.4 | 0.56 | Good |
| Example 9 | 1.73 | 0.67 | 29 | 64 | 0.3 | 0.56 | Good |
| Example 10 | 1.73 | 0.67 | 27 | 65 | 0.5 | 0.57 | Good |

TABLE 2

| | Particles | | | Compound oxide (A) | | Phosphorus compound (B) | | Alkaline earth metal or cobalt compound (C) | |
|---|---|---|---|---|---|---|---|---|---|
| | Kind | Average particle size (μm) | Content (wt %) | Ti/Si (molar ratio) | Content as titanium atoms (ppm) | Content as phosphorus atoms (ppm) | Ti/P (molar ratio) | Metal (content as metal atoms) (ppm) | Ti/metal (molar ratio) |
| Example 11 | Titanium dioxide | 0.56 | 0.5 | 90/10 | 15 | 30 | 0.32 | Calcium (40) | 0.3 |
| Example 12 | Titanium dioxide | 0.56 | 0.5 | 90/10 | 55 | 40 | 0.89 | Cobalt (2) | 33.8 |
| Example 13 | Titanium dioxide | 0.56 | 0.5 | 85/15 | 20 | 0.8 | 16 | Cobalt (40) | 0.46 |
| Example 14 | Titanium dioxide | 0.56 | 0.5 | 90/10 | 17 | 10 | 0.22 | Cobalt (180) | 0.12 |
| Comparative Example 1 | Nil | — | — | 95/5 | 40 | 30 | 0.86 | Cobalt (47) | 1.0 |
| Comparative Example 2 | Nil | — | — | 90/10 | 17 | 50 | 0.22 | Zinc (30), manganese (34) | — |
| Comparative Example 3 | Silicon oxide | 11.2 | 0.5 | 90/10 | 15 | 30 | 0.32 | Cobalt (47) | 0.39 |
| Comparative Example 4 | Titanium dioxide | 0.56 | 0.5 | Antimony trioxide | (300)* | 32 | — | Cobalt (5) | — |
| Comparative Example 5 | Titanium dioxide | 0.56 | 0.5 | Tetrabutyl titanate | (10)** | 20 | 0.32 | Cobalt (30) | 0.41 |

| | | Properties of polymer | | | | | Spinnability and stretchability (filtration pressure and yarn breaking) |
|---|---|---|---|---|---|---|---|
| | M/P | Inherent viscosity | Quality of carboxyl and groups (eq/tons) | Value L | Value b | Heat resistance index | |
| Example 11 | 1.38 | 0.66 | 26 | 73 | 1.5 | 0.56 | Good |
| Example 12 | 1.02 | 0.65 | 24 | 71 | 3.2 | 0.55 | Good |
| Example 13 | 45.3 | 0.65 | 53 | 70 | 1.7 | 0.62 | Good |
| Example 14 | 10.7 | 0.65 | 77 | 65 | −2.9 | 0.66 | Good |
| Comparative Example 1 | 1.73 | 0.65 | 29 | 56 | 0.8 | 0.57 | *** |
| Comparative Example 2 | 0.89 | 0.65 | 34 | 58 | 6.0 | 0.56 | *** |
| Comparative Example 3 | 1.18 | 0.66 | 37 | 68 | 1.8 | 0.60 | Filtration pressure rise and yarn breaking occurred. |
| Comparative Example 4 | 2.48 | 0.67 | 29 | 49 | 3.5 | 0.54 | Filtration pressure rise and yarn breaking occurred. |
| Comparative Example 5 | 1.29 | 0.66 | 32 | 57 | 6.5 | 0.67 | Good |

*In Comparative Example 4, antimony trioxide was used as the polycondensation catalyst instead of a compound oxide. The parenthesized numeral is the content as antimony metal element.
**In Comparative Example 5, tetrabutyl titanate was used as the polycondensation catalyst instead of a compound oxide. The parenthesized numeral is the content as titanium metal element.
***During spinning, yarn breaking and filtration pressure rise did not occur, but during stretching, the friction with guides, rollers, etc. was large, to cause frequent fuzzing.

EXAMPLES 15 TO 24 AND COMPARATIVE EXAMPLES 6 TO 8

Polyester compositions mainly containing a polyester consisting of an acid and a glycol shown in Table 3 or 4 and further containing particles, metal elements, phosphorus, etc. by quantities shown in Table 3 or 4 were used to form films (polyester A). Evaluation results are shown in Tables 3 and 4.

In Example 15, a polyester was produced as described for Example 1, using a compound oxide of Ti/Zr (molar ratio 90/10), phosphoric acid and aluminum silicate particles (average particle size 1.0 μm). Pellets of the polyester were sufficiently dried in vacuum at 160° C., and melt-extruded at 280° C. A casting drum was raised in the temperature of the surface immediately before casting, and while a tape electrode was used for electrostatic application, the extruded film was quickly cooled and solidified on the casting drum, to obtain a cast film.

The cast film was preheated at 100° C. for 3 seconds, simultaneously biaxially stretched at a stretching temperature of 100° C. (stretching ratio 2.7 times, stretching rate 2900%/min) using a linear motor type simultaneous biaxial stretcher, and heat treated at 191° C. with 3% relaxation for 4 seconds, to obtain a 30 μm thick film. The obtained film was especially excellent in the taste property and the long-term keeping quality.

In Example 16, a co-polyester containing a compound oxide of Ti/Si (molar ratio 80/20), phosphoric acid and calcium carbonate particles (average particle size 0.8 μm) was used. Pellets of the polyester were sufficiently dried in vacuum at 160° C., and melt-extruded at 280° C., and while a water film was produced on the surface of a casting drum, a tape electrode was used for electrostatic application. The extruded film was quickly cooled and solidified on the casting drum, to obtain a cast film. The obtained cast film was stretched by a tenter type sequential biaxial stretcher. In this case, the film was preheated at 92° C. for 1 second, stretched at a longitudinal stretching temperature of 96° C., at a longitudinal stretching ratio of 3.0 times, at a lateral stretching temperature of 111° C., and at a lateral stretching ratio of 3.0 times, and heat- treated at 176° C. with 3% relaxation. The film was good in the formability, and good in the taste property, though rather lower in the long-term keeping quality than that of Example 15.

In Examples 17, 19 and 20, films were produced as described for Example 16, except that the components of the polyester, the kind and quantity of the metal compound and the kind and quantity of the particles were changed as shown in Table 3. All the films were good in the formability, taste property and long-term keeping quality. In Example 18, a film was preheated at 107° C. for 3 seconds, sequentially biaxially stretched at a longitudinal stretching temperature of 103° C., at a longitudinal stretching ratio of 3.0 times (stretching rate 3000%/min), at a lateral stretching temperature of 120° C. and at a lateral stretching ratio of 2.9 times, and heat -treated at 190° C. The film was good in the formability, taste property and long-term keeping quality. In Example 24, a film was preheated at 107° C. for 3 seconds, sequentially biaxially stretched at a longitudinal stretching temperature of 103° C., at a longitudinal stretching ratio of 3.15 times (2-step stretching at ratios of 2.1 times and 1.5 times, average stretching rate 15000%/min), at a lateral stretching temperature of 120° C. and at a lateral stretching ratio of 3.2 times, and heat-treated at 190° C. The film was good in the formability, taste property and long-term keeping quality.

In Examples 21 to 23, laminated films consisting of a polyester A and a polyester B were stretched by a sequential biaxial stretcher. In Example 21, an A/B two-layer laminated film was produced, and in Examples 22 and 23, B/A/B three-layer laminated films were produced. The layer B was kept in contact with the lamination substrate. In Examples 21 and 22, films were preheated at 105° C. for 3 seconds, sequentially biaxially stretched at a longitudinal stretching temperature of 100° C., at a longitudinal stretching ratio of 2.9 times (2-step stretching at ratios of 1.3 times and 2.2 times), at a lateral stretching temperature of 120° C. and at a lateral stretching ratio of 3.0 times, and heat-treated at 190° C., and had a face orientation factor as shown in Table 4 on the layer A. The films were good in the formability, taste property and long-term keeping quality. In Example 23, a film was produced as described for Example 16, and was good in the formability, taste property and long-term keeping quality.

On the other hand, in Comparative Examples 6 to 8, films were produced to obtain the face orientation factors shown in Table 3 by changing the kind and quantity of the metal compound and the kind and quantity of the particles. In Comparative Example 6, a film was preheated at 90° C. for 1 second, stretched at a longitudinal stretching temperature of 95° C., at a longitudinal stretching ratio of 3.8 times, at a lateral stretching temperature of 120° C. and at a lateral stretching ratio of 4.5 times, and heat-treated at 190° C. The obtained film was especially poor in the formability 1 (drawing and ironing), taste property and long-term keeping quality.

TABLE 3

| | Polyester A | | | | | | | |
|---|---|---|---|---|---|---|---|---|
| | Acid and glycol as components of polyester (mol %) | Kind | Particles Average particle size (μm) | Content (wt %) | Ti/metal compound (molar ratio) | MA (millimole %) | MA-PA (millimole %) | Quantity of alkali metal (ppm) |
| Example 15 | TPA100 EG 98 DEG2 | Aluminum silicate | 1.0 | 0.15 | Ti/Zr 90/10 | 10 | 2 | 2 |
| Example 16 | TPA92 IPA8 EG 97 DEG3 | Calcium carbonate | 0.8 | 0.10 | Ti/Si 80/20 | 5 | 0 | 0 |
| Example 17 | TPA92 IPA8 EG 97 DEG3 | Colloidal silica | 1.1 | 0.10 | Ti/Al 91/9 | 22 | 4 | 2 |
| Example 18 | TPA97 NDC3 EG 98 DEG2 | Aluminum silicate | 1.0 | 0.15 | Ti/Zr 80/20 | 5 | 3 | 2 |
| Example 19 | TPA92 IPA8 EG 97 DEG3 | Calcium carbonate | 0.8 | 0.10 | Ti/Si 80/20 | 10 | −11 | 0 |
| Example 20 | TPA92 IPA8 EG 97 DEG3 | Colloidal silica | 1.1 | 0.10 | Ti/Al 91/9 | 22 | 11 | 2 |
| Example 24 | TPA100 EG 99 DEG1 | Silicon oxide | 2.0 | 0.10 | Ti/Si 90/10 | 17.8 | −0.8 | 0 |
| Comparative Example 6 | TPA100 EG 98 DEG2 | — | — | 0 | Ti | 50 | 2 | 2 |
| Comparative Example 7 | TPA87 IPA13 EG 97 DEG3 | Wet silica | 1.0 | 0.15 | Ti/Ca 20/80 | 75 | 0 | 0 |
| Comparative Example 8 | TPA100 EG 90 DEG10 | Colloidal silica | 1.1 | 0.10 | Ti | 50 | −21 | 3 |

| | Polyester A | | | Properties of film | | | | |
|---|---|---|---|---|---|---|---|---|
| | Inherent viscosity | Quantity of carboxyl end groups (eq/ton) | Melting point (° C.) | Laminate composition and thickness (mm) | Face orientation factor | TF/TI | Formability-1/ Formability 2 | Taste property/ Long-term keeping quality |
| Example 15 | 0.65 | 40 | 257 | Layer A 30 | 0.124 | 0.53 | ◯/◯ | ⊚/◉ |

TABLE 3-continued

| | | | | | | | | |
|---|---|---|---|---|---|---|---|---|
| Example 16 | 0.68 | 42 | 236 | Layer A 25 | 0.116 | 0.54 | o/◎ | ◎/o |
| Example 17 | 0.66 | 47 | 236 | Layer A 25 | 0.117 | 0.53 | ◎/◎ | o/o |
| Example 18 | 0.65 | 40 | 250 | Layer A 25 | 0.122 | 0.53 | o/◎ | ◎/◎ |
| Example 19 | 0.67 | 40 | 236 | Layer A 25 | 0.117 | 0.54 | o/o | o/o |
| Example 20 | 0.72 | 28 | 236 | Layer A 25 | 0.117 | 0.53 | o/o | o/o |
| Example 24 | 0.66 | 47 | 257 | Layer A 25 | 0.142 | 0.51 | o/o | ◎/◎ |
| Comparative Example 6 | 0.65 | 44 | 257 | Layer A 30 | 0.171 | 0.53 | x/x | Δ/x |
| Comparative Example 7 | 0.68 | 44 | 224 | Layer A 25 | 0.091 | 0.54 | Δ/o | x/x |
| Comparative Example 8 | 0.66 | 43 | 235 | Layer A 25 | 0.128 | 0.53 | Δ/o | Δ/x |

TABLE 4

| | | Polyester A | | | | | | |
|---|---|---|---|---|---|---|---|---|
| | Acid and glycol as components of polyester (mol %)* | Particles | | | Ti/metal compound (molar ratio) | MA/MB (millimole %)** | MA-PA/MB-PA (millimole %)*** | Quantity of alkali metal (ppm) |
| | | Kind | Average particle size (μm) | Content (wt %) | | | | |
| Example 21 | TPA100 EG 98 DEG2 | Aluminum silicate | 1.0 | 0.15 | Ti/Zr 90/10 | 10/— | 2/— | 2 |
| | TPA97 NDC3 | Colloidal silica | 0.8 | 0.10 | Ge/Ti 50/50 | —/20 | —/2 | 2 |
| Example 23 | TPA100 EG 93 DEG3 NPG4 | Calcium carbonate | 0.8 | 0.10 | Ti/Si 89/11 | 9/— | 0/— | 0 |
| | TPA92 IPA8 EG 97 DEG3 | Wet silica | 1.2 | 0.15 | Ti/Ca 25/75 | —/80 | —/22 | 0 |
| Example 22 | TPA96 IPA8 EG 97 DEG3 | Colloidal silica | 1.1 | 0.10 | Ti/Al 91/9 | 22/— | 4/— | 2 |
| | TPA92 IPA8 EG 97 DEG3 | Colloidal silica | 1.1 | 0.10 | Ti/Al 80/20 | —/10 | —/2 | 2 |

| | Polyester A | | | Properties of film | | | | |
|---|---|---|---|---|---|---|---|---|
| | Inherent viscosity | Quantity of carboxyl end groups (eq/ton) | Melting point (° C.) | Laminate composition and thickness (mm) | Face orientation factor | TF/TI**** | Formability-1/ Formability 2 | Taste property/ Long-term keeping quality |
| Example 21 | 0.65 | 40 | 257 | A/B 20/5 | 0.128 | 0.54 | ◎/◎ | ◎/◎ |
| | 0.66 | 42 | 250 | | | | | |
| Example 23 | 0.68 | 42 | 252 | B/A/B 2/20/2 | 0.129 | 0.54 | ◎/◎ | ◎/◎ |
| | 0.64 | 40 | 236 | | | | | |
| Example 22 | 0.66 | 47 | 236 | B/A/B 2/20/2 | 0.118 | 0.53 | o/◎ | ◎/o |
| | 0.66 | 40 | 236 | | | | | |

*The symbols for the acids and glycols as components of polyesters represent the following:
TPA: Terephthalic acid
EG: Ethylene glycol
IPA: Isophthalic acid
DEG: Diethylene glycol
NDC: Naphthalenedicarboxylic acid
NPG: Neopentyl glycol
**MA: Total concentration of Ti, Al, Zr, and Si among all the catalyst metal elements remaining in the polyester A (millimole %)
MB: Total concentration of all the catalyst metal elements remaining in the polyester B.
***PA: Concentration of phosphorus element remaining in the polyester A (millimole %)
PB: Concentration of phosphorus element remaining in the polyester B (millimole %)
****TF: Film thickness of the least thick portion of the film of a formed container (μm)
TI: Film thickness of the thickest portion of the film of a formed container (μm)

Industrial Applicability

The polyester composition of the present invention has excellent moldability and heat resistance and overcomes such problems as die contamination, filtration pressure rise and yarn breaking in the production of such moldings as fibers, films and bottles. Furthermore, the polyester film of the present invention is suitable for packaging, being having formability, heat resistance, taste properties and long-term keeping qualities, and can be suitably used for packaging materials, above all for being formed, especially for being laminated and formed with a substrate such as paper, non-woven fabric or metal, to make containers, etc.

What is claimed is:

1. A polyester composition comprising a polyester, a compound oxide (A), and 0.001 to 40 wt % of inert particles having an average particle size of 0.01 to 10 μm, said weight being based on the weight of the polyester composition, wherein said compound oxide (A) comprises 0.5–300 ppm of titanium as an essential element and a metallic element selected from the group consisting of aluminum, zirconium, germanium, tin and silicon.

2. A polyester composition according to claim 1, which further comprises a phosphorus compound (B) comprising 0.5 to 400 ppm of phosphorus atoms and at least one compound (C) selected from a group consisting of said alkaline earth metal compounds and cobalt compounds comprising 5 to 300 ppm of said alkaline earth metal atoms or said cobalt atoms.

3. A polyester composition according to claim 2, wherein said composition comprises said titanium and phosphorus compounds in a molar ratio (Ti/P) of titanium atoms in said compound oxide (A) to phosphorus atoms in said phosphorus compound (B) of 0.1 to 20.

4. A polyester composition according to claim 2, wherein the total concentration MA millimole % in of Ti, Al, Zr, Ge, Sn and Si elements and the concentration PA millimole % in of said phosphorus compound expressed as elemental phosphorus, respectively present in said polyester compositions satisfy the following formula (1):

$$0.1 \leq MA/PA \leq 20 \qquad (1).$$

5. A polyester composition according to claim 1, wherein the quantity of carboxyl end groups of said polyester is 10 to 70 equivalents/ton.

6. A method for producing a polyester composition defined in claim 1, said method comprising forming a reaction mixture comprising an esterification reaction component or ester interchange reaction component of
   an aromatic dicarboxylic acid or any of its ester formable derivatives and
   a diol or any of its ester formable derivatives,
   wherein said reaction mixture performs a polycondensation reaction able to produce the corresponding polyester composition, wherein said reaction is performed in the presence of:
   a compound oxide (A) and the separate inert particles defined in claim 1, and wherein said compound oxide (A) is added to said reaction mixture after said inert particles have been added to the reaction mixture.

7. A method according to claim 6, wherein said compound (C) is added to said reaction mixture either simultaneously with the addition of said inert particles or after adding said dispersible particles to said reaction mixture, and wherein said compound oxide (A) is added to said reaction mixture subsequently to said addition of said compound (C).

8. A polyester film comprising a polyester composition defined in claim 1, as the main component.

9. A polyester film according to claim 8, wherein the quantity of carboxyl end groups in said polyester is 25 to 50 equivalents/ton.

10. A polyester film according to claim 8, wherein said polyester composition has a face orientation factor of 0.08 to 0.17.

11. A polyester film, wherein a polyester film is laminated at least on one side of said polyester film defined in claim 8 (polyester film A), and wherein the following equation (c) is satisfied:

$$MB \geq MA \qquad (c),$$

where MA represents the total concentration (millimole %) of Ti, Al, Zr, Ge, Sn and Si elements contained in said polyester film A, and wherein MB represents the concentration (millimole %) of all the catalyst metal elements contained in said polyester film B.

12. A polyester film according to claim 8, which is structured in a package.

13. A polyester film according to claim 12, which is formed.

14. A polyester film according to claim 13, which is formed with a lamination substrate.

15. A polyester film according to claim 14, wherein said lamination substrate is paper or a nonwoven fabric.

16. A polyester film according to claim 14, wherein said lamination substrate is a metal.

17. A polyester composition according to claim 1, wherein the compound oxide (A) is selected from the group consisting of Ti/Si compound oxide, Ti/Si/Al compound oxide, Ti/Zr compound oxide, and Ti/Zr/Al compound oxide.

18. A polyester composition according to claim 1, wherein the compound oxide (A) is Ti/Si compound oxide.

19. A polyester composition according to claim 18, wherein the Ti/Si molar ratio of the compound oxide (A) is 20/1 to 1/20.

* * * * *

UNITED STATES PATENT AND TRADEMARK OFFICE
CERTIFICATE OF CORRECTION

PATENT NO. : 6,365,659 B1
DATED : April 2, 2002
INVENTOR(S) : Aoyama et al.

It is certified that error appears in the above-identified patent and that said Letters Patent is hereby corrected as shown below:

Column 11,
Line 66, please change "Th" to -- TF --.

Column 12,
Line 3, please change "$0.1 \leq T$" to -- $0.1 \leq TF$ --.

Signed and Sealed this

Twenty-sixth Day of November, 2002

Attest:

JAMES E. ROGAN
Attesting Officer  Director of the United States Patent and Trademark Office